United States Patent
Yang et al.

(10) Patent No.: US 9,370,036 B2
(45) Date of Patent: Jun. 14, 2016

(54) MESSAGE TRANSMITTING METHOD AND DEVICE

(71) Applicant: Huawei Technologies Co., Ltd., Shenzhen, Guangdong (CN)

(72) Inventors: Xiuli Yang, Shanghai (CN); Yi Yu, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/445,540

(22) Filed: Jul. 29, 2014

(65) Prior Publication Data

US 2015/0038152 A1    Feb. 5, 2015

(30) Foreign Application Priority Data

Jul. 31, 2013    (CN) .......................... 2013 1 0328602

(51) Int. Cl.
*H04W 76/02*    (2009.01)
*H04W 52/24*    (2009.01)
*H04W 52/14*    (2009.01)

(52) U.S. Cl.
CPC .......... *H04W 76/027* (2013.01); *H04W 52/146* (2013.01); *H04W 52/243* (2013.01)

(58) Field of Classification Search
CPC ....... H04W 4/005; H04W 4/02; H04W 28/10; H04W 36/0016; H04W 36/0022; H04W 36/06; H04W 36/08; H04W 36/014; H04W 36/20; H04W 36/24; H04W 48/06; H04W 52/0225; H04W 52/10; H04W 52/16; H04W 36/0055
See application file for complete search history.

(56) References Cited

U.S. PATENT DOCUMENTS

| | | | | |
|---|---|---|---|---|
| 8,744,508 B2* | 6/2014 | Chen | ................... | H04W 76/027 370/329 |
| 2008/0182577 A1* | 7/2008 | Ng | ..................... | H04W 72/1257 455/435.2 |
| 2009/0131063 A1* | 5/2009 | Yi | ......................... | H04W 76/02 455/450 |
| 2013/0012215 A1* | 1/2013 | Seo | ................... | H04W 36/0066 455/450 |

(Continued)

OTHER PUBLICATIONS

3rd Generation Partnership Project; Technical Specification Group Radio Access Network; Enhanced uplink; Overall description; Stage 2 (Release 11), 3GPP TS 25.319 v11.6.0, Dec. 2012, 87 pages.

(Continued)

*Primary Examiner* — Michael Mapa
*Assistant Examiner* — Martin Chang

(57) ABSTRACT

Embodiments of the present invention relate to the field of communications, and provide a message transmitting method and device. The method includes: transmitting, by a user equipment UE, a radio resource control request to a base station, where the UE is in an enhanced uplink cell forward access channel CELL_FACH state and a system information block SIB5 includes an uplink interference value; when no radio resource control response message is received from the base station within a preset time and it is determined that the current number of times the radio resource control request is transmitted is smaller than a preset maximum number of transmissions, read an SIB7 periodically and obtain the uplink interference value; when determining, according to the uplink interference value, to transmit the radio resource control request message to the base station, transmit the radio resource control request message to the base station again.

16 Claims, 4 Drawing Sheets

(56) References Cited

U.S. PATENT DOCUMENTS

2013/0045771 A1\* 2/2013 Martin ................ H04W 52/24
455/522
2014/0086196 A1\* 3/2014 Zhu ........................ H04L 5/003
370/329

OTHER PUBLICATIONS

3rd Generation Partnership Project; Technical Specification Group Radio Access Network; Radio Resource Control (RRC); Protocol specification (Release 11), 3GPP TS 25.331 v11.6.0, Jun. 2013, 2084 pages.

\* cited by examiner

MESSAGE TRANSMITTING METHOD AND DEVICE

CROSS-REFERENCE TO RELATED APPLICATION

This application claims priority to Chinese Patent Application No. 201310328602.5, filed on Jul. 31, 2013, which is hereby incorporated by reference in its entirety.

TECHNICAL FIELD

The present invention relates to the field of communications, and in particular, to a message transmitting method and device.

BACKGROUND

In the prior art, for a UE (User Equipment, user equipment) on an enhanced uplink CELL_FACH (Cell Forward Access Channel, cell forward access channel), in a process of initiating an RRC (Radio Resource Control, Radio Resource Control) connection establishment with a base station, before the UE transmits an RRC connection establishment request message to the base station, the UE needs to read an uplink interference value included in an SIB (System Information Block, system information block) 5, and transmits an RRC connection establishment request message to the base station according to the uplink interference value; when to the UE does not receive an RRC connection establishment response from the base station within a preset time, the UE transmits the RRC connection establishment request message to the base station again until a preset maximum number of transmissions is reached.

It should be noted that the uplink interference value changes with a current communication environment. When the UE transmits the RRC connection establishment request message to the base station again, because the UE no longer reads the SIB5, the UE transmits the RRC connection establishment request message to the base station again according to the uplink interference value in the SIB5 that is read before the UE transmits for a first time the RRC connection establishment request message to the base station. However, because the uplink interference value may be greatly changed, a transmit power of the UE may be relatively low if the UE transmits the RRC connection establishment request message to the base station according to the uplink interference value in the SIB5 that is read before the UE transmits for a first time the RRC connection establishment request message to the base station, which causes a failure in transmitting the RRC connection establishment request message and further causes a failure of RRC establishment by the UE.

SUMMARY

Embodiments of the present invention provide a message transmitting method and device to ensure that a UE accesses a base station successfully when uplink interference is strong.

In a first aspect, a message transmitting method is provided, including:

transmitting, by a user equipment UE, a radio resource control request message to a base station, where the UE is in an enhanced uplink cell forward access channel CELL_FACH state and a system information block SIB5 includes an uplink interference value;

when no radio resource control response message is received from the base station within a preset time and it is determined that the current number of times the radio resource control request message is transmitted is smaller than a preset maximum number of transmissions, reading an SIB7 periodically and obtaining the uplink interference value, where the SIB7 is transmitted by the base station to the UE; and when determining, according to the uplink interference value, to transmit the radio resource control request message to the base station, transmitting the radio resource control request message to the base station again.

In a first possible implementation of the first aspect, after the transmitting the radio resource control request message to the base station again, the method further includes: after receiving a radio resource control response from the base station, stopping reading the SIB7 periodically.

With reference to the first aspect or the first possible implementation, in a second possible implementation, the transmitting, by a UE, a radio resource control request message to a base station includes:

transmitting, by the UE, a radio resource control RRC connection establishment request message to the base station;

the reading, when no radio resource control response message is received from the base station within a preset time and it is determined that the current number of times the radio resource control request message is transmitted is smaller than a preset maximum number of transmissions, an SIB7 periodically and obtaining the uplink interference value includes:

when no RRC connection establishment response message is received from the base station within a preset time and it is determined that the current number of times the RRC connection establishment request message is transmitted is smaller than a preset maximum number of transmissions, reading the SIB7 periodically and obtaining the uplink interference value; and the transmitting, when determining, according to the uplink interference value, to transmit the radio resource control request message to the base station, the radio resource control request message to the base station again includes:

when determining, according to the uplink interference value, to transmit the RRC connection establishment request message to the base station, transmitting the RRC connection establishment request message to the base station again.

With reference to the second possible implementation, in a third possible implementation, after the transmitting the RRC connection establishment request message to the base station again, the method further includes:

after receiving an RRC connection establishment response message from the base station, transmitting an RRC connection establishment complete message to the base station;

after transmitting the RRC connection establishment complete message to the base station, transmitting a cell change request message to the base station;

when no cell change response message is received from the base station within a preset time and it is determined that the current number of times the cell change request message is transmitted is smaller than a preset maximum number of transmissions, reading the SIB7 periodically and obtaining the uplink interference value; and when determining, according to the uplink interference value, to transmit the cell change request message to the base station, transmitting the cell change request message to the base station again.

With reference to the first aspect or the first possible implementation, in a fourth possible implementation, the transmitting, by a LIE, a radio resource control request message to a base station includes:

transmitting, by the UE, a cell change request message to the base station;

the reading, when no radio resource control response message is received from the base station within a preset time and it is determined that the current number of times the radio resource control request message is transmitted is smaller than a preset maximum number of transmissions, an SIB7 periodically and obtaining the uplink interference value includes:

when no cell change response message is received from the base station within a preset time and it is determined that the current number of times the cell change request message is transmitted is smaller than a preset maximum number of transmissions, reading the SIB7 periodically and obtaining the uplink interference value; and the transmitting, according to the uplink interference value, the radio resource control request message to the base station again includes:

when determining, according to the uplink interference value, to transmit the cell change request message to the base station, transmitting the cell change request message to the base station again.

In a second aspect, a UE is provided, including:

a transmitting unit, configured to transmit a radio resource control request message to a base station, where the UE is in an enhanced uplink cell forward access channel CELL_FACH state and a system information block SIB5 includes an uplink interference value; and a reading unit, configured to: when no radio resource control response message is received from the base station within a preset time and it is determined that the current number of times the radio resource control request message is transmitted is smaller than a preset maximum number of transmissions, read a system information block SIB7 periodically and obtain the uplink interference value, where the SIB7 is transmitted by the base station to the UE, where:

the transmitting unit is further configured to: when determining, according to the uplink interference value obtained by the reading unit, to transmit the radio resource control request message to the base station, transmit the radio resource control request message to the base station again.

In a first possible implementation of the second aspect, the reading unit is further configured to stop reading the SIB7 periodically after a radio resource control response message is received from the base station.

With reference to the second aspect or the first possible implementation, in a second possible implementation, the transmitting unit is specifically configured to transmit an RRC connection establishment request message to the base station;

the reading unit is specifically configured to: when no RRC connection establishment response message is received from the base station within a preset time and it is determined that the current number of times the RRC connection establishment request message is transmitted is smaller than a preset maximum number of transmissions, read the SIB7 periodically and obtain the uplink interference value; and the transmitting unit is specifically configured to: when determining, according to the uplink interference value obtained by the reading unit, to transmit the RRC connection establishment request message to the base station, transmit the RRC connection establishment request message to the base station again.

With reference to the second possible implementation, in a third possible implementation, the transmitting unit is further configured to transmit an RRC connection establishment complete message to the base station after an RRC connection establishment response message is received from the base station;

the transmitting unit is further configured to: after transmitting the RRC connection establishment complete message to the base station, transmit a cell change request message to the base station;

the reading unit is further configured to: when no cell change response message is received from the base station within a preset time and it is determined that the current number of times the cell change request message is transmitted is smaller than a preset maximum number of transmissions, read the SIB7 periodically and obtain the uplink interference value; and the transmitting unit is further configured to: when determining, according to the uplink interference value obtained by the reading unit, to transmit the cell change request message to the base station, transmit the cell change request message to the base station again.

With reference to the second aspect or the first possible implementation, in a fourth possible implementation, the transmitting unit is specifically configured to transmit a cell change request message to the base station;

the reading unit is specifically configured to: when no cell change response message is received from the base station within a preset time and it is determined that the current number of times the cell change request message is transmitted is smaller than a preset maximum number of transmissions, read the SIB7 periodically and obtain the uplink interference value; and the transmitting unit is specifically configured to: when determining, according to the uplink interference value obtained by the reading unit, to transmit the cell change request message to the base station, transmit the cell change request message to the base station again.

In the foregoing solutions, when a UE transmit a radio resource control request message to a base station and receives no radio resource control response message from the base station within a preset time, the UE reads an uplink interference value in an SIB7, and transmits, according to the uplink interference value, the radio resource control request message to the base station again. In this way, when the UE transmits a radio resource control request message to the base station again, the UE transmits, according to the uplink interference value in the SIB7, the radio resource control request message to the base station again, so that when there is a great change to the uplink interference value, the UE can transmit the radio resource control request message to the base station again according to a changed uplink interference value and a sufficient transmit power can be provided when the UE transmits the radio resource control request message again, thereby ensuring that the UE accesses the base station successfully when uplink interference is strong.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a base station may be a radio network subsystem (Radio Network Subsystem, RNS) on a 3G network.

Figure 1:
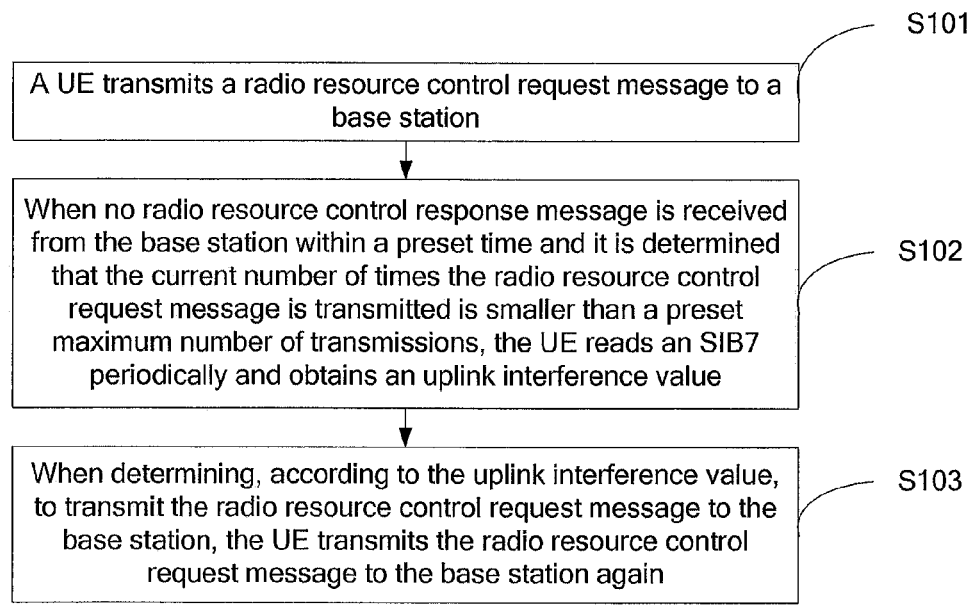
FIG. 1 is a schematic diagram of a message transmitting method according to an embodiment of the present invention.

An embodiment of the present invention provides a message transmitting method. As shown in FIG. 1, the method may be executed by a UE, and the method includes:

S101. A UE transmits a radio resource control request message to a base station.

The UE is in an enhanced uplink CELL_FACH state, and an SIB5 includes an uplink interference value. For example, when a READY_FOR_COMMON_EDCH variable of the UE is TRUE, it indicates that the UE is in an enhanced uplink CELL_FACH state.

Optionally, if the UE transmits a radio resource control request message to the base station for a first time, the UE reads an uplink interference value in the SIB5 before transmitting the radio resource control request message, and transmits the radio resource control request message according to the uplink interference value.

S102. When no radio resource control response message is received from the base station within a preset time and it is determined that the current number of times the radio resource control request message is transmitted is smaller than a preset maximum number of transmissions, the UE reads an SIB7 periodically and obtains the uplink interference value.

The SIB7 is transmitted by the base station to the UE.

Specifically, because the uplink interference value changes with a communication environment, the base station may transmit the SIB7 to the UE periodically according to a preset interval to inform the UE of a changed uplink interference value; and the UE obtains a reading interval, and reads the uplink interference value in the SIB7 according to the reading interval.

In one possible implementation of the present invention, the UE may obtain the reading interval according to scheduling information in an MIB (Master Information Block, master information block) or an SB (Scheduling block, scheduling block) 1 or an SB2.

Exemplarily, if the UE does not receive a radio resource control response message within a preset time and determines that the current number of times the radio resource control request message is transmitted is smaller than a preset maximum number of transmissions (that is, the UE needs to transmit the radio resource control request message to the base station again), the UE reads a first uplink interference value in the SIB7, reads a second uplink interference value in the SIB7 after one reading interval, and further reads a third uplink interference value in the SIB7 after another reading interval. If, at this time, the UE determines, according to the third uplink interference value, to transmit the radio resource control request message to the base station, the UE transmits the radio resource control request message to the base station again.

S103. When determining, according to the uplink interference value, to transmit the radio resource control request message to the base station, the UE transmits the radio resource control request message to the base station again.

Specifically, the UE determines a transmit power of the UE according to the uplink interference value, and transmits a random access request message to the base station according to the transmit power; and after receiving a random access response message, the UE determines to transmit the radio resource control request message to the base station.

Further, after receiving a radio resource control response message from the base station, the UE stops reading the SIB7 periodically, due to the following reasons: (1) the UE does not need to read the SIB7 again, because the UE, after receiving the radio resource control response message, does not need to transmit the radio resource control request message; (2) an additional power of the UE needs to be consumed when the UE reads the uplink interference value in the SIB7, and in this embodiment of the present invention, the UE may stop reading the uplink interference value in the SIB7 to reduce power consumption of the UE.

Optionally, this embodiment of the present invention may be applied to an RRC connection establishment procedure. In this case, the foregoing radio resource control request message may be an RRC connection establishment request message, and the corresponding radio resource control response message may be an RRC connection establishment response message.

The UE transmits an RRC connection establishment request message to the base station; when no RRC connection establishment response message is received from the base station within a preset time and it is determined that the current number of times the RRC connection request message is transmitted is smaller than a preset maximum number of transmissions, the UE reads the SIB7 periodically and obtains an uplink interference value; and when determining, according to the uplink interference value, to transmit an RRC connection establishment request message to the base station, the UE transmits the RRC connection establishment request message to the base station again.

Specifically, after the UE transmits the RRC connection establishment request message, a timer T300 is started, where the T300 defines how long the UE waits for receiving an RRC connection establishment response message after the UE transmits the RRC connection establishment request message; if the UE still does not receive the RRC connection establishment response message after a time period indicated by the T300 expires and a V300 is smaller than an N300, the UE reads the SIB7 periodically and obtains an uplink interference value; and if determining, according to the uplink interference value, to transmit an RRC connection establishment request message to the base station, the UE transmits the RRC connection establishment request message to the base station again, where the N300 is a preset maximum number of transmissions of the RRC connection establishment request message by the UE and the V300 is a current number of times the RRC connection establishment request message is transmitted by the UE.

Optionally, this embodiment of the present invention may be applied to a cell change procedure. In this case, the foregoing radio resource control request message may be a cell change request message, and the corresponding radio resource control response message may be a cell change response message.

The UE transmits a cell change request message to the base station; and when no cell change response message is received from the base station within a preset time and it is determined that the current number of times the cell change request message is transmitted is smaller than a preset maximum number of transmissions, the UE reads the SIB7 periodically and obtains the uplink interference value; and when determining, according to the uplink interference value, to transmit the cell change request message to the base station, the UE transmits the cell change request message to the base station again.

Specifically, after the UE transmits the cell change request message, a timer T302 is started, where the T302 defines how long the UE waits for receiving a cell change response message after the UE transmits the cell change request message; if the UE still does not receive the cell change response message after a time period indicated by the T302 expires and a V302 is smaller than an N302, the UE reads the SIB7 periodically and obtains the uplink interference value, and transmits, according to the uplink interference value, the cell change request message to the base station again, where the N302 is a preset maximum number of transmissions of the cell change request message by the UE and the V302 is the current number of times the cell change request message is transmitted by the UE.

It should be noted that the foregoing cell change procedure may be implemented after the foregoing RRC connection establishment procedure is completed. Specifically, after the UE receives an RRC connection establishment response message from the base station, the UE transmits an RRC connection establishment complete message to the base station; and if a cell change occurs after the UE transmits the RRC connection establishment complete message to the base station, the UE transmits a cell change request message to the base station; when no cell change response message is received from the base station within a preset time and it is determined that the current number of times the cell change request message is transmitted is smaller than a preset maximum number of transmissions, the UE reads the SIB7 and obtains the uplink interference value; when determining, according to the uplink interference value, to transmit the cell change request message to the base station, the UE transmits the cell change request message to the base station again.

In the foregoing solution executed by a UE, when the UE transmits a radio resource control request message to the base station again, the UE transmits the radio resource control request message to the base station again according to an uplink interference value in an SIB7. In this way, when there is a great change to the uplink interference value, the UE can transmit the radio resource control request message to the base station again according to a changed uplink interference value, so that a sufficient transmit power is provided when the UE transmits the radio resource control request message again, thereby ensuring that the UE accesses the base station successfully when uplink interference is strong.

Figure 2:
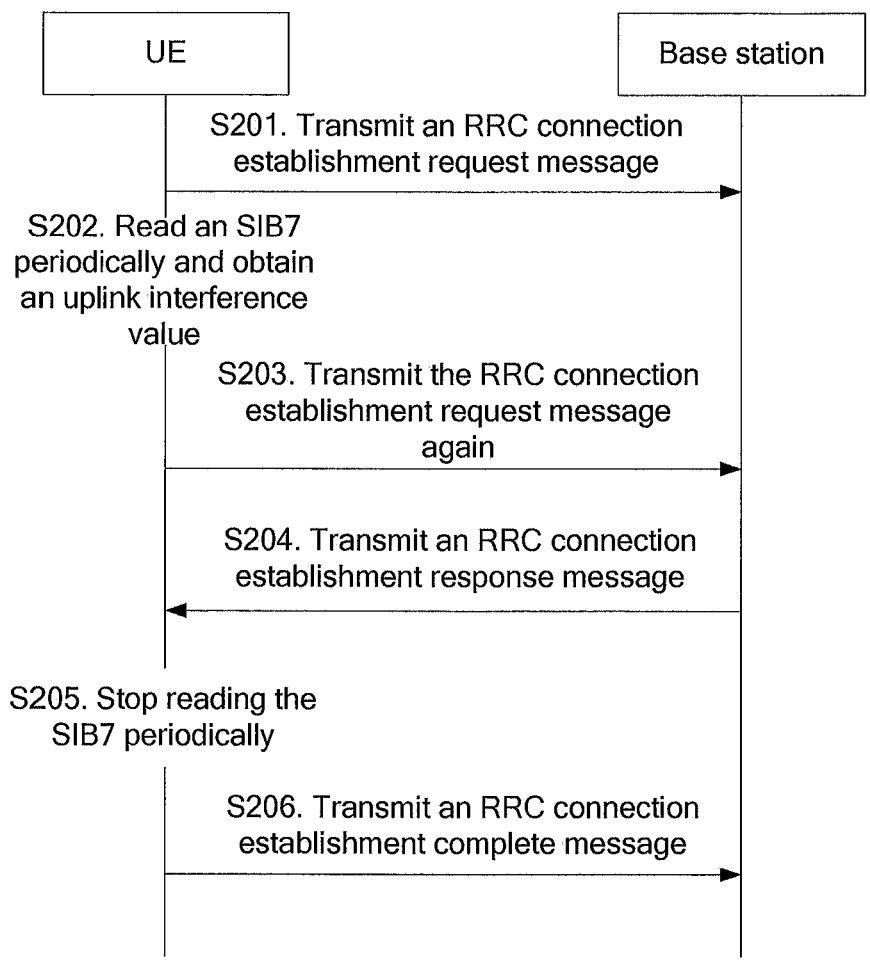
FIG. 2 is a schematic flowchart of a message transmitting method according to an embodiment of the present invention.

An embodiment of the present invention provides a message transmitting method. As shown in FIG. 2, this embodiment of the present invention is applied in an RRC connection establishment procedure and is applied to a UE that is in an enhanced uplink CELL_FACH state, and the method includes:

S201. When a UE determines to establish an RRC connection with a base station, the UE transmits an RRC connection establishment request message to the base station.

After the UE transmits the RRC connection establishment request message to the base station, a T300 is started, where the T300 defines how long the UE waits for receiving an RRC connection establishment response message after the UE transmits the RRC connection establishment request message.

It should be noted that, before the UE transmits the RRC connection establishment request message, the UE reads an uplink interference value in an SIB5, and transmits the RRC connection establishment request message according to the uplink interference value.

S202. If the UE still does not receive an RRC connection establishment response message when a time period indicated by the T300 expires and determines that a V300 is smaller than an N300, the UE reads an SIB7 periodically and obtains an uplink interference value.

The N300 is a preset maximum number of transmissions of the RRC connection establishment request message by the UE, and the V300 is the current number of times the RRC connection establishment request message is transmitted by the UE.

Specifically, because the uplink interference value changes with a communication environment, the base station may transmit the SIB7 to the UE periodically according to a preset interval to inform the UE of a changed uplink interference value; and the UE obtains a reading interval, and reads the uplink interference value in the SIB7 according to the reading interval.

In one possible implementation of the present invention, the UE may obtain the reading interval according to scheduling information in an MIB or an SB1 or an SB2.

Exemplarily, if the UE does not receive an RRC connection establishment response message within a preset time and determines that the current number of times the RRC connection establishment request message is transmitted is smaller than a preset maximum number of transmissions (that is, the UE needs to transmit the RRC request message to the base station again), the UE reads a first uplink interference value in the SIB7, reads a second uplink interference value in the SIB7 after one reading interval, and further reads a third uplink interference value in the SIB7 after another reading interval. If, at this time, the UE determines, according to the third uplink interference value, to transmit the RRC request message to the base station, the UE transmits the RRC connection establishment request message to the base station again.

S203. When determining, according to the uplink interference value, to transmit the RRC connection establishment request to the base station, the UE transmits the RRC connection establishment request message to the base station again.

Specifically, the UE determines a transmit power of the UE according to the uplink interference value, and transmits a random access request message to the base station according to the transmit power; and after receiving a random access response message, the UE determines to transmit the RRC connection establishment request message to the base station.

S204. After receiving the RRC connection establishment request message, the base station transmits an RRC connection establishment response message to the UE.

S205. After receiving the RRC connection establishment response message, the UE stops reading the SIB7 periodically.

Because the UE, after receiving the RRC connection establishment response message, does not need to transmit the RRC request message again, the UE does not need to read the SIB7 again. In this embodiment of the present invention, the UE may stop reading the uplink interference value in the SIB7 to reduce power consumption of the UE, considering that an additional power of the UE needs to be consumed when the UE reads the uplink interference value in the SIB7.

S206. The UE transmits an RRC connection establishment complete message to the base station, so as to complete the RRC connection establishment.

It should be noted that, if the UE still does not receive an RRC connection establishment response within a preset time after the UE transmits the RRC connection establishment request message for a second time and the V300 is still smaller than the N300, the UE determines, according to a currently read uplink interference value in the SIB7, to transmit an RRC connection establishment request message to the base station; then, the UE transmits the RRC connection establishment request message for a third time; if an RRC connection establishment response message is still not received, the UE continues reading the SIB7 periodically and transmits the RRC connection establishment request message to the base station according to a read uplink interference value until an RRC connection establishment response message is received from the base station or until the V300 is greater than or equal to the N300. For details about the specific implementation, reference may be made to the foregoing step S201 to step S203, and details are not described herein again.

In this way, in an RRC connection establishment procedure, when a UE transmits an RRC connection establishment request message to a base station again, the UE transmits the RRC connection establishment request message to the base station again according to an uplink interference value in an SIB7. Therefore, when there is a great change to the uplink interference value, the UE can transmit the RRC connection establishment request message to the base station again according to a changed uplink interference value, so that a sufficient transmit power is provided when the UE transmits the RRC request message again, thereby ensuring that the UE establishes an RRC connection with the base station successfully.

It should be noted that, for brief description, the foregoing method embodiment is described as a combination of a series of actions. However, a person skilled in the art should understand that the present invention is not limited to the described order of actions because some steps may be implemented in other orders or concurrently according to the present invention. In addition, a person skilled in the art should also understand that the embodiments described in this specification are all exemplary embodiments and the involved actions and modules are not necessarily mandatory in the present invention.

Figure 3:
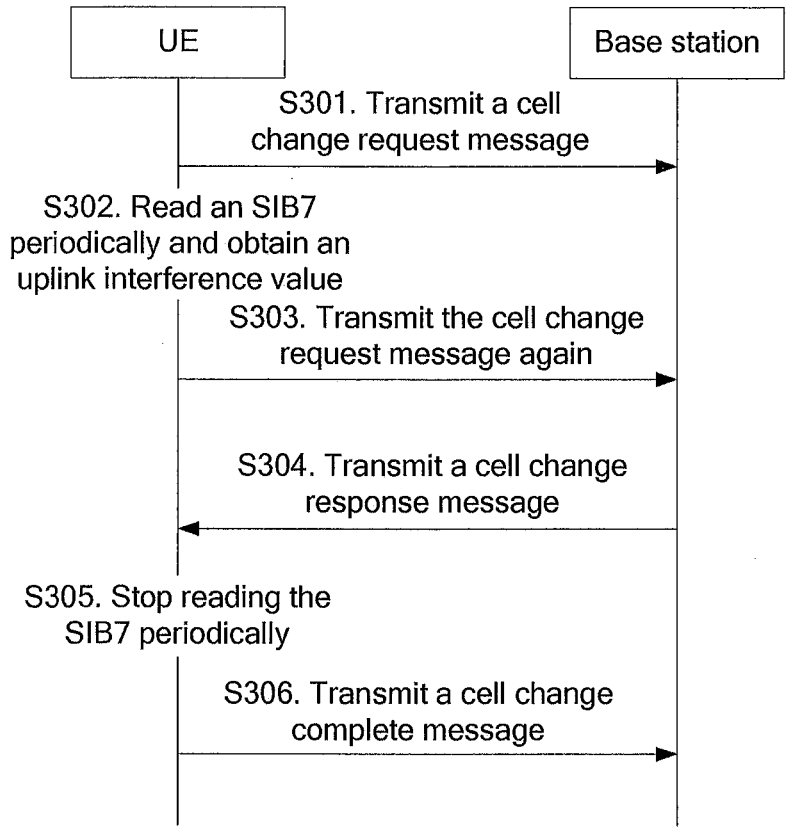
FIG. 3 is a schematic flowchart of another message transmitting method according to an embodiment of the present invention.

An embodiment of the present invention provides a message transmitting method. As shown in FIG. 3, this method embodiment of the present invention is applied in a cell change procedure and is applied to a UE that is in an enhanced uplink CELL_FACH state, and the method includes:

S301. After establishing an RRC connection, a UE transmits a cell change request message to a base station.

After the UE transmits the cell change request message to the base station, a T302 is started, where the T302 defines how long the UE waits for receiving a cell change response message after the UE transmits the cell change request message.

It should be noted that, before the UE transmits the cell change request message, the UE reads an uplink interference value in an SIB5, and transmits the cell change request message according to the uplink interference value.

In addition, for details about a procedure of establishing the foregoing RRC connection, reference may be made to the RRC connection establishment procedure shown in FIG. 2, and this embodiment of the present invention is not intended to place a limitation on the RRC connection establishment procedure.

S302. If the UE still does not receive a cell change response message when a time period indicated by the T302 expires and determines that a V302 is smaller than an N302, the UE reads an SIB7 periodically and obtains an uplink interference value.

The N302 is a preset maximum number of transmissions of the cell change request message by the UE, and the V302 is the current number of times the cell change request message is transmitted by the UE.

Specifically, because an uplink interference value changes with a communication environment, the base station may transmit the SIB7 to the UE periodically according to a preset interval to inform the UE of a changed uplink interference value; and the UE obtains a reading interval, and reads the uplink interference value in the SIB7 according to the reading interval.

In one possible implementation of the present invention, the UE may obtain the reading interval according to scheduling information in an MIB or an SB1 or an SB2.

Exemplarily, if the UE does not receive a cell change response message within a preset time and determines that the current number of times the cell change request message is transmitted is smaller than a preset maximum number of transmissions (that is, the UE needs to transmit the cell change request message to the base station again), the UE reads a first uplink interference value in the SIB7, reads a second uplink interference value in the SIB7 after one reading interval, and further reads a third uplink interference value in the SIB7 after another reading interval. If, at this time, the UE determines, according to the third uplink interference value, to transmit the cell change request message to the base station, the UE transmits the cell change request message to the base station again.

S303. When determining, according to the uplink interference value, to transmit the cell change request to the base station, the UE transmits the cell change request message to the base station again.

Specifically, the UE determines a transmit power of the UE according to the uplink interference value, and transmits a random access request message to the base station according to the transmit power; and after receiving a random access response message, the UE determines to transmit the cell change request message to the base station.

S304. After receiving the cell change request message, the base station transmits a cell change response message to the UE.

S305. After receiving the cell change response message, the UE stops reading the uplink interference value in the SIB7 periodically.

Because the UE, after receiving the cell change response message, does not need to transmit the cell change request message again, the UE does not need to read the SIB7 again. In this embodiment of the present invention, the UE may stop reading the uplink interference value in the SIB7 to reduce power consumption of the UE, considering that an additional power of the UE needs to be consumed when the UE reads the uplink interference value in the SIB7.

S306. The UE transmits a cell change complete message to the base station, so as to complete the cell change.

It should be noted that, if the UE still does not receive a cell change response message within a preset time after the UE transmits the cell change request message for a second time and the V302 is still smaller than the N302, the UE determines, according to the currently read uplink interference value in the SIB7, to transmit a cell change request message to the base station; then, the UE transmits the cell change request message for a third time; if a cell change response message is still not received, the UE continues reading the SIB7 periodically and transmits a cell change request message to the base station according to the read uplink interference value until a cell change response message is received from the base station or until the V302 is greater than or equal to the N302. For details about the specific implementation, reference may be made to the foregoing step S301 to step S303, and details are not described herein again.

In this way, in a cell change procedure, when a UE transmits a cell change request message to a base station again, the UE transmits the cell change request message to the base station again according to an uplink interference value in an SIB7. Therefore, when there is a great change to the uplink interference value, the UE can transmit the cell change request message to the base station again according to a changed uplink interference value, so that a sufficient transmit power is provided when the UE transmits the cell change request message again, thereby ensuring that the UE establishes an RRC connection with the base station successfully.

It should be noted that, for brief description, the foregoing method embodiment is described as a combination of a series of actions. However, a person skilled in the art should understand that the present invention is not limited to the described order of actions because some steps may be implemented in other orders or concurrently according to the present invention. In addition, a person skilled in the art should also understand that the embodiments described in the specification are all exemplary embodiments and the involved actions and modules are not necessarily mandatory in the present invention.

Figure 4:
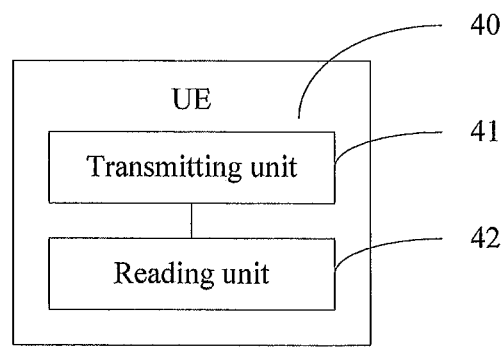
FIG. 4 is a schematic structural diagram of a UE according to an embodiment of the present invention.

An embodiment of the present invention provides a UE 40. As shown in FIG. 4, the UE 40 includes a transmitting unit 41 and a reading unit 42.

The transmitting unit 41 is configured to transmit a radio resource control request message to a base station.

The UE is in an enhanced uplink cell forward access channel CELL_FACH state and a system information block SIB5 includes an uplink interference value. For example, when a READY_FOR_COMMON_EDCH variable of the UE is TRUE, it indicates that the UE is in an enhanced uplink CELL_FACH state.

Optionally, if the UE transmits a radio resource control request message to the base station for a first time, the UE reads an uplink interference value in the SIB5 before transmitting the radio resource control request message, and transmits the radio resource control request message according to the uplink interference value.

The reading unit 42 is configured to: when no radio resource control response message is received from the base station within a preset time and it is determined that the current number of times the radio resource control request message is transmitted is smaller than a preset maximum number of transmissions, read an SIB7 periodically and obtain the uplink interference value.

The SIB7 is transmitted by the base station to the UE.

Specifically, because an uplink interference value changes with a communication environment, the base station may transmit the SIB7 to the UE periodically according to a preset interval to inform the UE of a changed uplink interference value; and the UE obtains a reading interval, and reads the uplink interference value in the SIB7 according to the reading interval.

In one possible implementation of the present invention, the UE may obtain the reading interval according to scheduling information in an MIB (Master Information Block, master information block) or an SB (Scheduling block, scheduling block) 1 or an SB2.

Exemplarily, if the UE does not receive a radio resource control response message within a preset time and determines that the current number of times the radio resource control request message is transmitted is smaller than a preset maximum number of transmissions (that is, the UE needs to transmit the radio resource control request message to the base station again), the UE reads a first uplink interference value in the SIB7, reads a second uplink interference value in the SIB7 after one reading interval, and further reads a third uplink interference value in the SIB7 after another one reading interval. If, at this time, the UE determines, according to the third uplink interference value, to transmit the radio resource control request message to the base station, the UE transmits the radio resource control request message to the base station again.

The transmitting unit 41 is further configured to: when determining, according to the uplink interference value obtained by the reading unit 42, to transmit the radio resource control request message to the base station, transmit the radio resource control request message to the base station again.

Specifically, the UE determines a transmit power of the UE according to the uplink interference value, and transmits a random access request message to the base station according to the transmit power; and after receiving a random access response message, the UE determines to transmit the radio resource control request message to the base station.

Further, the reading unit 42 is further configured to: after a radio resource control response message is received from the base station, stop reading the SIB7 periodically.

Because the UE, after receiving the radio resource control response message, does not need to transmit the radio resource control request message again, the UE does not need to read the SIB7 again. In this embodiment of the present invention, the UE may stop reading the uplink interference value in the SIB7 to reduce power consumption of the UE, considering that an additional power of the UE needs to be consumed when the UE reads the uplink interference value in the SIB7.

Optionally, in an RRC connection establishment procedure, the transmitting unit 41 is specifically configured to transmit an RRC connection establishment request message to the base station;

the reading unit 42 is specifically configured to: when no RRC connection establishment response message is received from the base station within a preset time and it is determined that the current number of times the RRC connection establishment request message is transmitted is smaller than a preset maximum number of transmissions, read the SIB7 periodically and obtain the uplink interference value; and the transmitting unit 41 is specifically configured to: when determining, according to the uplink interference value obtained by the reading unit 42, to transmit the RRC connection establishment request message to the base station, transmit the RRC connection establishment request message to the base station again.

Specifically, after the UE transmits the RRC connection establishment request message, a T300 is started, where the T300 defines how long the UE waits for receiving an RRC connection establishment response message after the UE transmits the RRC connection establishment request message; if the UE still does not receive an RRC connection establishment response message after a time period indicated by the T300 expires and a V300 is smaller than an N300, the UE reads the SIB7 periodically and obtains the uplink interference value, and determines, according to the uplink interference value, to transmit the RRC connection establishment request message to the base station; and then, the UE transmits the RRC connection establishment request message to the base station again, where the N300 is a preset maximum number of transmissions of the RRC connection establishment request message by the UE and the V300 is a current number of times the RRC connection establishment request message is transmitted by the UE.

Further, the transmitting unit 41 is further configured to: after an RRC connection establishment response message is received from the base station, transmit an RRC connection establishment complete message to the base station;

the transmitting unit 41 is further configured to: after transmitting the RRC connection establishment complete message to the base station, transmit a cell change request message to the base station;

the reading unit 42 is further configured to: when a cell change response message is not received from the base station within a preset time and it is determined that the current number of times that the cell change request message is transmitted is smaller than a preset maximum number of transmissions, read the SIB7 periodically and obtain the uplink interference value; and the transmitting unit 41 is further configured to: when determining, according to the uplink interference value obtained by the reading unit 42, to transmit the cell change request message to the base station, transmit the cell change request message to the base station again.

Optionally, in a cell change procedure, the transmitting unit 41 is specifically configured to transmit a cell change request message to the base station;

the reading unit 42 is specifically configured to: when no cell change response message is received from the base station within a preset time and it is determined that the current number of times the cell change request message is transmitted is smaller than a preset maximum number of transmissions, read the SIB7 periodically and obtain the uplink interference value; and the transmitting unit 41 is specifically configured to: when determining, according to the uplink interference value obtained by the reading unit 42, to transmit the cell change request message to the base station, transmit the cell change request message to the base station again.

Specifically, after the UE transmits the cell change request message, a T302 is started, where the T302 defines how long the UE waits for receiving a cell change response message after the UE transmits the cell change request message; if the UE still does not receive a cell change response message after a time period indicated by the T302 expires and a V302 is smaller than an N302, the UE reads the uplink interference value in the SIB7, and transmits, according to the uplink interference value, the cell change request message to the base station again, where the N302 is a preset maximum, number of transmissions of the cell change request message by the UE and the V302 is the current number of times the cell change request message is transmitted by the UE.

When the foregoing UE transmits a radio resource control request message to a base station again, the UE transmits the radio resource control request message to the base station again according to an uplink interference value in an SIB7. In this way, when there is a great change to the uplink interference value, the UE can transmit the radio resource control request message to the base station again according to a changed uplink interference value, so that a sufficient transmit power is provided when the UE transmits the radio resource control request message again, thereby ensuring that the UE accesses the base station successfully when uplink interference is strong.

It may be clearly understood by a person skilled in the art that, for the purpose of convenient and brief description, for details about a specific working process and description of the foregoing UE, reference may be made to a corresponding process in the foregoing method embodiments, and details are not described herein again.

Figure 5:
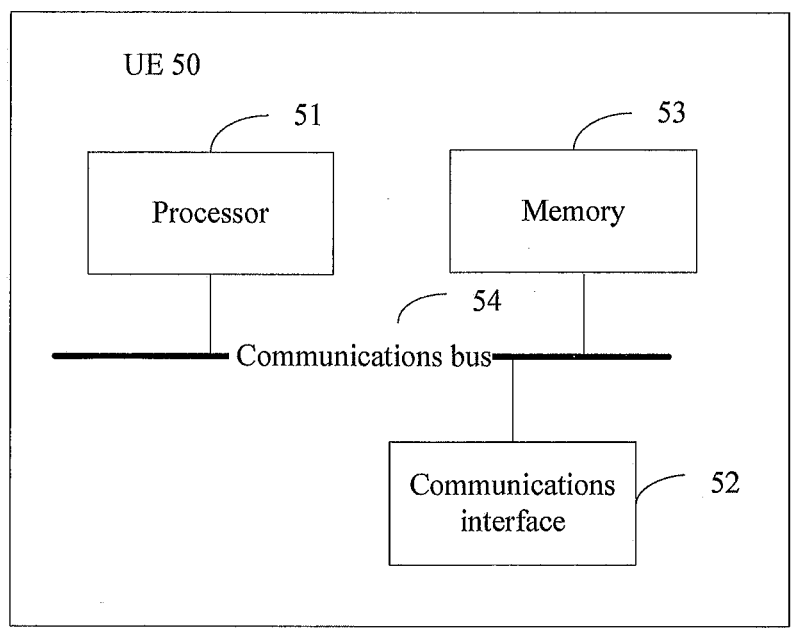
FIG. 5 is a schematic structural diagram of another UE according to an embodiment of the present invention.

An embodiment of the present invention provides a UE 50. As shown in FIG. 5, the UE 50 includes a processor (processor) 51, a communications interface (Communications Interface) 52, a memory (memory) 53, and a communications bus 54, where the processor 51, the communications interface 52, and the memory 53 communicates with one other through the communications bus 54.

The processor 51 may be a central processing unit CPU, or an application specific integrated circuit ASIC (Application Specific Integrated Circuit), or be configured as one or multiple integrated circuits in this embodiment of the present invention.

The memory 53 is configured to store program code, where the program code includes computer operation instructions. The memory 53 may include a high speed RAM memory, and may also include a non-volatile memory (non-volatile memory), for example, at least one magnetic disk memory.

The communications interface 52 is configured to implement communicative connections between these apparatuses.

The processor 51 executes the program code and is configured to: transmit a radio resource control request message to a base station, where the UE is in an enhanced uplink cell forward access channel CELL_FACH state and a system information block SIB5 includes an uplink interference value; when no radio resource control response message is received from the base station within a preset time and it is determined that the current number of times the radio resource control request is transmitted is smaller than a preset maximum number of transmissions, read an SIB7 periodically and obtain the uplink interference value; and when determining, according to the uplink interference value, to transmit the radio resource control request message to the base station, transmit the radio resource control request message to the base station again.

The SIB7 is transmitted by the base station to the UE.

Optionally, the processor 51 is further configured to: after a radio resource control response message is received from the base station, stop reading the SIB7 periodically.

The processor is specifically configured to transmit the radio resource control request message to the base station again according to a currently read uplink interference value.

Optionally, the processor 51 is specifically configured to: when no RRC connection establishment response message is received from the base station within a preset time and it is determined that the current number of times the RRC connection establishment request message is transmitted is smaller than a preset maximum number of transmissions, read the SIB7 periodically and obtain the uplink interference value, and when determining, according to the uplink interference value, to transmit the RRC connection establishment request message to the base station, transmit the RRC connection establishment request message to the base station again.

Optionally, the processor 51 is further configured to: after receiving an RRC connection establishment response message from the base station, transmit an RRC connection establishment complete message to the base station and transmit a cell change request message to the base station; when no cell change response message is received from the base station within a preset time and it is determined that the current number that the cell change request message is transmitted is smaller than a preset maximum number of transmissions, read the SIB7 periodically and obtain the uplink interference value; and when determining, according to the uplink interference value, to transmit the cell change request message to the base station, transmit the cell change request message to the base station again.

Optionally, the processor 51 is specifically configured to: transmit a cell change establishment request message to the base station; when no cell change response message is received from the base station within a preset time and it is determined that the current number of times the cell change request message is transmitted is smaller than a preset maximum number of transmissions, read the SIB7 periodically and obtain the uplink interference value; and when determining, according to the uplink interference value, to transmit the cell change request message to the base station, transmit the cell change request message to the base station again.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A message transmitting method, comprising:
    transmitting, by a user equipment (UE), a radio resource control request message a first time to a base station, wherein the UE is in an enhanced uplink cell forward access channel CELL_FACH state and a system information block SIB5 comprises an uplink interference value used in transmitting the radio resource control request message the first time;
    when no radio resource control response message is received from the base station within a preset time and it is determined that the current number of times the radio resource control request message is transmitted is smaller than a preset maximum number of transmissions, reading a system information block SIB7 periodically and obtaining an updated uplink interference value, wherein the SIB7 is transmitted by the base station to the UE; and
    transmitting the radio resource control request message a subsequent time to the base station again according to the updated uplink interference value.

2. The method according to claim 1, wherein, after transmitting the radio resource control request message a subsequent time to the base station again, the method further comprises:
    after receiving a radio resource control response from the base station, stopping reading the SIB7 periodically.

3. The method according to claim 1, wherein transmitting, by a UE, a radio resource control request message to a base station comprises:
    transmitting, by the UE, a radio resource control (RRC), connection establishment request message to the base station;
    when no RRC response message is received from the base station within a preset time and it is determined that the current number of times the RRC connection request message is transmitted is smaller than a preset maximum number of transmissions, reading the SIB7 periodically and obtaining the updated uplink interference value; and
    transmitting the RRC connection establishment request message to the base station again according to the updated uplink interference value.

4. The method according to claim 3, wherein after the transmitting the RRC connection establishment request message to the base station again, the method further comprises:
    after receiving an RRC connection establishment response message from the base station, transmitting an RRC connection establishment complete message to the base station;
    after transmitting the RRC connection establishment complete message to the base station, transmitting a cell change request message to the base station;
    when no cell change response message is received from the base station within a preset time and it is determined that the current number of times the cell change request message is transmitted is smaller than a preset maximum number of transmissions, reading the SIB7 periodically and obtaining the updated uplink interference value; and
    transmitting the cell change request message to the base station again according to the updated uplink interference value.

5. The method according to claim 2, wherein transmitting, by a UE, a radio resource control request message to a base station comprises:
    transmitting, by the UE, a radio resource control (RRC) connection establishment request message to the base station;
    when no RRC response message is received from the base station within a preset time and it is determined that the current number of times the RRC connection request message is transmitted is smaller than a preset maximum number of transmissions, reading the SIB7 periodically and obtaining the updated uplink interference value; and
    transmitting the RRC connection establishment request message to the base station again according to the updated uplink interference value.

6. The method according to claim 5, wherein after transmitting the RRC connection establishment request message to the base station again, the method further comprises:
    after receiving an RRC connection establishment response message from the base station, transmitting an RRC connection establishment complete message to the base station;
    after transmitting the RRC connection establishment complete message to the base station, transmitting a cell change request message to the base station;
    when no cell change response message is received from the base station within a preset time and it is determined that the current number of times the cell change request message is transmitted is smaller than a preset maximum number of transmissions, reading the SIB7 periodically and obtaining the updated uplink interference value; and
    transmitting the cell change request message to the base station again according to the updated interference value.

7. The method according to claim 1, wherein transmitting, by a UE, a radio resource control request message to a base station comprises:
    transmitting, by the UE, a cell change request message to the base station;

when no cell change response message is received from the base station within a preset time and it is determined that the current number of times the cell change request message is transmitted is smaller than a preset maximum number of transmissions, reading the SIB7 periodically and obtaining the updated uplink interference value; and
transmitting the cell change request message to the base station again according to the updated uplink interference value.

8. The method according to claim 2, wherein transmitting, by a UE, a radio resource control request message to a base station comprises:
transmitting, by the UE, a cell change request message to the base station;
when no cell change response message is received from the base station within a preset time and it is determined that the current number of times the cell change request message is transmitted is smaller than a preset maximum number of transmissions, reading the SIB7 periodically and obtaining the updated uplink interference value; and
transmitting the cell change request message to the base station again according to the updated uplink interference value.

9. A user equipment (UE), comprising:
a transmitting unit, configured to transmit a radio resource control request message a first time to a base station, wherein the UE is in an enhanced uplink cell forward access channel CELL_FACH state and a system information block SIB5 comprises an uplink interference value used in transmitting the radio resource control request message the first time; and
a reading unit, configured to: when no radio resource control response message is received from the base station within a preset time and it is determined that the current number of times the radio resource control request message is transmitted is smaller than a preset maximum number of transmissions, read a system information block SIB7 periodically and obtain an updated uplink interference value, wherein the SIB7 is transmitted by the base station to the UE, wherein:
the transmitting unit is further configured to: transmit the radio resource control request message a subsequent time to the base station again according to the updated uplink interference value.

10. The UE according to claim 9, wherein the reading unit is further configured to stop reading the SIB7 periodically after a radio resource control response message is received from the base station.

11. The UE according to claim 9, wherein:
the transmitting unit is configured to transmit a radio resource control (RRC) connection establishment request message to the base station;
the reading unit is configured to: when no RRC connection establishment response message is received from the base station within a preset time and it is determined that the current number of times the RRC connection establishment request message is transmitted is smaller than a preset maximum number of transmissions, read the SIB7 periodically and obtain the updated uplink interference value; and
the transmitting unit is configured to transmit the RRC connection establishment request message to the base station again according to the updated uplink interference value.

12. The UE according to claim 11, wherein:
the transmitting unit is further configured to transmit an RRC connection establishment complete message to the base station after an RRC connection establishment response message is received from the base station;
the transmitting unit is further configured to: after transmitting the RRC connection establishment complete message to the base station, transmit a cell change request message to the base station;
the reading unit is further configured to: when no cell change response message is received from the base station within a preset time and it is determined that the current number of times the cell change request message is transmitted is smaller than a preset maximum number of transmissions, read the SIB7 periodically and obtain the updated uplink interference value; and
the transmitting unit is further configured to transmit the cell change request message to the base station again according to the updated uplink interference value.

13. The UE according to claim 10, wherein:
the transmitting unit is configured to transmit a radio resource control (RRC) connection establishment request message to the base station;
the reading unit is configured to: when no RRC connection establishment response message is received from the base station within a preset time and it is determined that the current number of times the RRC connection establishment request message is transmitted is smaller than a preset maximum number of transmissions, read the SIB7 periodically and obtain the updated uplink interference value; and
the transmitting unit is configured to transmit the RRC connection establishment request message to the base station again according to the updated uplink interference value.

14. The UE according to claim 13, wherein:
the transmitting unit is further configured to transmit an RRC connection establishment complete message to the base station after an RRC connection establishment response message is received from the base station;
the transmitting unit is further configured to: after transmitting the RRC connection establishment complete message to the base station, transmit a cell change request message to the base station;
the reading unit is further configured to: when no cell change response message is received from the base station within a preset time and it is determined that the current number of times the cell change request message is transmitted is smaller than a preset maximum number of transmissions, read the SIB7 periodically and obtain the updated uplink interference value; and
the transmitting unit is further configured to transmit the cell change request message to the base station again according to the updated uplink interference value.

15. The UE according to claim 9, wherein:
the transmitting unit is configured to transmit a cell change request message to the base station;
the reading unit is configured to: when no cell change response message is received from the base station within a preset time and it is determined that the current number of times the cell change request message is transmitted is smaller than a preset maximum number of transmissions, read the SIB7 periodically and obtain the updated uplink interference value; and
the transmitting unit is configured to transmit the cell change request message to the base station again according to the updated uplink interference value.

16. The UE according to claim 10, wherein:
the transmitting unit is configured to transmit a cell change request message to the base station;

the reading unit is configured to: when no cell change response message is received from the base station within a preset time and it is determined that the current number of times the cell change request message is transmitted is smaller than a preset maximum number of transmissions, read the SIB7 periodically and obtain the updated uplink interference value; and the transmitting unit is configured to transmit the cell change request message to the base station again according to the updated uplink interference value.

* * * * *